US012695521B2

(12) United States Patent
Chen et al.

(10) Patent No.: US 12,695,521 B2
(45) Date of Patent: Jul. 28, 2026

(54) MEASUREMENT METHOD, CONFIGURATION METHOD, TERMINAL, AND NETWORK-SIDE DEVICE

(71) Applicant: VIVO MOBILE COMMUNICATION CO., LTD., Guangdong (CN)

(72) Inventors: Li Chen, Guangdong (CN); Xueming Pan, Guangdong (CN); Dajie Jiang, Guangdong (CN); Xiaodong Shen, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 352 days.

(21) Appl. No.: 17/514,033

(22) Filed: Oct. 29, 2021

(65) Prior Publication Data

US 2022/0053350 A1 Feb. 17, 2022

Related U.S. Application Data

(63) Continuation of application No. PCT/CN2020/087817, filed on Apr. 29, 2020.

(30) Foreign Application Priority Data

Apr. 30, 2019 (CN) .......................... 201910364201.2

(51) Int. Cl.
| | |
|---|---|
| *H04B 17/318* | (2015.01) |
| *H04B 17/309* | (2015.01) |
| *H04W 24/08* | (2009.01) |
| *H04W 24/10* | (2009.01) |
| *H04W 52/02* | (2009.01) |

(52) U.S. Cl.
CPC .......... *H04B 17/309* (2015.01); *H04W 24/08* (2013.01); *H04W 24/10* (2013.01)

(58) Field of Classification Search
None
See application file for complete search history.

(56) References Cited

U.S. PATENT DOCUMENTS

| | | | | |
|---|---|---|---|---|
| 10,764,806 B2 * | 9/2020 | Li | .......................... | H04L 5/0048 |
| 10,834,773 B2 * | 11/2020 | Novlan | ............... | H04W 40/205 |
| 11,483,895 B2 * | 10/2022 | Liu | .................... | H04W 52/0216 |
| 12,015,984 B2 * | 6/2024 | Wong | .................... | H04W 24/10 |
| 12,133,169 B2 * | 10/2024 | Yang | .................... | H04L 5/0091 |
| 2019/0320490 A1 * | 10/2019 | Liu | .................... | H04W 52/0216 |

(Continued)

FOREIGN PATENT DOCUMENTS

| | | |
|---|---|---|
| CN | 103974320 A | 8/2014 |

OTHER PUBLICATIONS

VIVO, "UE Power Consumption Reduction in RRM Measurement", 3GPP TSG RAN WG1 Meeting #96bis, R1-1904121, Xi'an, China, Apr. 8-12, 2019.

(Continued)

*Primary Examiner* — Sithu Ko
(74) *Attorney, Agent, or Firm* — Price Heneveld LLP

(57) ABSTRACT

This application provides a measurement method, a configuration method, a terminal, and a network-side device. The measurement method includes: obtaining at least one radio resource management RRM measurement threshold, and adjusting RRM measurement based on an RRM measurement result for a local cell of the terminal and the at least one RRM measurement threshold.

9 Claims, 4 Drawing Sheets

(56) References Cited

U.S. PATENT DOCUMENTS

| 2020/0314868 | A1* | 10/2020 | Tseng | ........................ | H04W 8/08 |
| 2022/0007293 | A1* | 1/2022 | Kaikkonen | ....... | H04W 52/0251 |
| 2022/0110063 | A1* | 4/2022 | Wong | .................... | H04W 24/10 |
| 2022/0131596 | A1* | 4/2022 | Sharma | .............. | H04W 72/542 |

OTHER PUBLICATIONS

VIVO, "Summary#5 of UE power Consumption Reduction in RRM Measurements", 3GPP TSG RAN WG1 Meeting #96, R1-1903805, Athens, Greece, Feb. 25-Mar. 1, 2019.

OPPO, "UE power Consumption Reduction in RRM Measurements", 3GPP TSG RAN WG1 #96, R1-1903351, Athens, Greece, Feb. 25-Mar. 1, 2019.

Qualcomm Inc., "Discussion on open issues in WUS RRM in NB-IoT", 3GPP TSG-RAN WG4 Meeting #87, R4-1806864, Busan, South Korea, May 21-25, 2018.

Institute for Information Industry (III), "Solutions for reducing power consumption for measurements of neighbour cells in NB-IoT", 3GPP TSG RAN WG2#99, R2-1708258, Berlin, Germany, Aug. 21-25, 2017.

LG Electronics, "Discussion on UE power consumption reduction in RRM measurements", 3GPP TSG RAN WG1 #96, R1-1902054, Athens, Greece, Feb. 25-Mar. 1, 2019.

Qualcomm Incorporated, "UE Power Consumption Reduction in RRM Measurements", 3GPP TSG-RAN WG1 Meeting #96, R1-1903017. Athens, Greece, Feb. 25-Mar. 1, 2019.

* cited by examiner

FIG. 1
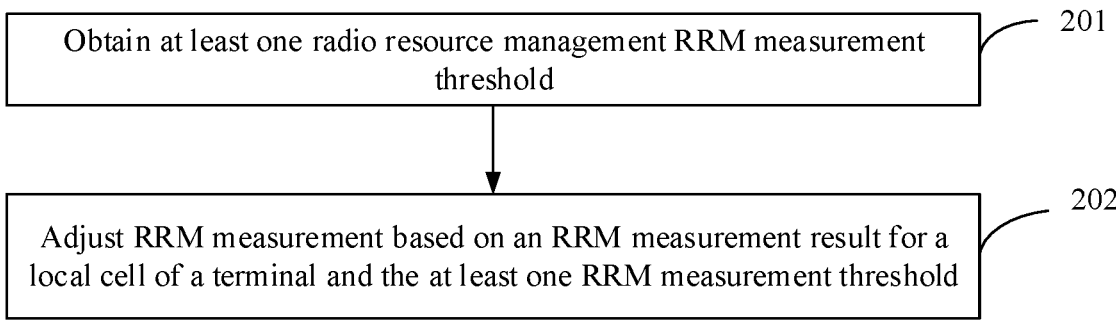
FIG. 2
Send configuration information, where the configuration information is used to configure at least one RRM measurement threshold, and the at least one RRM measurement threshold is used to adjust RRM measurement — 301
FIG. 3

MEASUREMENT METHOD, CONFIGURATION METHOD, TERMINAL, AND NETWORK-SIDE DEVICE

CROSS-REFERENCE TO RELATED APPLICATIONS

This application is a continuation application of PCT International Application No. PCT/CN2020/087817 filed on Apr. 29, 2020, which claims priority to Chinese Patent Application No. 201910364201.2 filed in China on Apr. 30, 2019. The disclosures of these applications are incorporated herein by reference in their entireties.

TECHNICAL FIELD

Embodiments of this disclosure relate to the field of communications technologies, and in particular, to a measurement method, a configuration method, a terminal, and a network-side device.

BACKGROUND

In a communication process between a terminal and a network-side device, the terminal may perform radio resource management (RRM) measurement on a local cell and a neighboring cell to obtain, through measurement, a signal fading status and signal quality between the terminal and the network-side device.

In the related art, the terminal performs RRM measurement based on an RRM measurement configuration from the network-side device, featuring low flexibility.

SUMMARY

Embodiments of this disclosure provide a measurement method, a configuration method, a terminal, and a network-side device, so as to resolve the problem of low flexibility in the related art that a terminal performs RRM measurement based on an RRM measurement configuration from a network-side device.

In order to resolve the foregoing problem, this disclosure is implemented as follows:

According to a first aspect, an embodiment of this disclosure provides a measurement method applied to a terminal, where the method includes:

obtaining at least one radio resource management RRM measurement threshold; and adjusting RRM measurement based on an RRM measurement result for a local cell of the terminal and the at least one RRM measurement threshold.

According to a second aspect, an embodiment of this disclosure further provides a configuration method, applied to a network-side device. The method includes:

sending configuration information, where the configuration information is used to configure at least one RRM measurement threshold, and the at least one RRM measurement threshold is used to adjust RRM measurement.

According to a third aspect, an embodiment of this disclosure further provides a terminal, where the terminal includes:

an obtaining module, configured to obtain at least one radio resource management RRM measurement threshold; and an adjusting module, configured to adjust RRM measurement based on an RRM measurement result for a local cell of the terminal and the at least one RRM measurement threshold.

According to a fourth aspect, an embodiment of this disclosure further provides a network-side device, where the network-side device includes:

a transmitting module, configured to send configuration information, where the configuration information is used to configure at least one RRM measurement threshold, and the at least one RRM measurement threshold is used to adjust RRM measurement.

According to a fifth aspect, an embodiment of this disclosure further provides a terminal, where the terminal includes a processor, a memory, and a computer program stored in the memory and capable of running on the processor. When the computer program is executed by the processor, the steps of the measurement method described above are implemented.

According to a sixth aspect, an embodiment of this disclosure further provides a network-side device, where the network-side device includes a processor, a memory, and a computer program stored in the memory and capable of running on the processor. When the computer program is executed by the processor, the steps of the configuration method described above are implemented.

According to a seventh aspect, an embodiment of this disclosure further provides a computer-readable storage medium. The computer-readable storage medium stores a program, and when the program is executed by a processor, the steps of the measurement method described above or the steps of the configuration method described above are implemented.

In the embodiments of this disclosure, the terminal obtains at least one radio resource management RRM measurement threshold, and adjusts RRM measurement based on the RRM measurement result for the local cell of the terminal and the at least one RRM measurement threshold. In this way, compared with the related art, flexibility of RRM measurement can be improved, achieving the effects of saving power consumption of a terminal or enhancing measurement accuracy.

BRIEF DESCRIPTION OF DRAWINGS

To describe the technical solutions in the embodiments of this disclosure more clearly, the following briefly introduces the accompanying drawings required for describing the embodiments of this disclosure. Apparently, the accompanying drawings in the following description show merely some embodiments of this disclosure, and a person of ordinary skill in the art may still derive other drawings from these accompanying drawings without creative efforts.

FIG. 1 is a structural diagram of a network system to which the embodiments of this disclosure are applicable;

FIG. 2 is a flowchart of a measurement method according to an embodiment of this disclosure;

FIG. 3 is a flowchart of a configuration method according to an embodiment of this disclosure;

DESCRIPTION OF EMBODIMENTS

Figure 4:
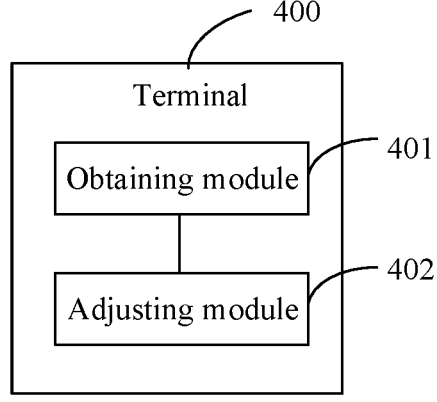
FIG. 4 is a first structural diagram of a terminal according to an embodiment of this disclosure.

The following clearly describes the technical solutions in the embodiments of this disclosure with reference to the accompanying drawings in the embodiments of this disclosure. Apparently, the described embodiments are some but not all of the embodiments of this disclosure. All other embodiments obtained by a person of ordinary skill in the art based on the embodiments of this disclosure without creative efforts shall fall within the protection scope of this disclosure.

In the specification and claims of this application, the terms such as "first" and "second" are intended to distinguish between similar objects but do not necessarily indicate a specific order or sequence. Moreover, the terms "include", "have" and any other variants mean to cover the non-exclusive inclusion, for example, a process, method, system, product, or device that includes a list of steps or units is not necessarily limited to those units, but may include other units not expressly listed or inherent to such a process, method, product, or device. In addition, the use of "and/or" in this application means at least one of connected objects. For example, A and/or B and/or C means the following seven cases: A alone, B alone, C alone, both A and B, both B and C, both A and C, and all of A, B, and C. Similarly, "at least one of A or B" or "at least one of A and B" used in the specification and claims means the following three cases: A alone, B alone, or both A and B.

Referring to FIG. 1, FIG. 1 is a structural diagram of a network system to which the embodiments of this disclosure are applicable. As shown in FIG. 1, a terminal device 11 and a network-side device 12 are included. The terminal 11 and the network-side device 12 may communicate with each other.

In the embodiments of this disclosure, the terminal 11 may also be referred to as user equipment (UE). In actual implementation, the terminal 11 may be a terminal-side device such as a mobile phone, a tablet computer, a laptop computer, a personal digital assistant (PDA), a mobile Internet device (MID), a wearable device or an in-vehicle device. It should be noted that a specific type of the terminal 11 is not limited in the embodiments of this disclosure.

The network-side device 12 may be a base station, a relay, or an access point.

The measurement method in this embodiment of this disclosure can be applied to a terminal. In specific implementation, the terminal in this embodiment of this disclosure may be an idle-state terminal, an inactive-state terminal, or a connected-state terminal.

It should be noted that, for an idle-state terminal or an inactive-state terminal, a local cell of the terminal can be understood as a cell in which the terminal camps; and for a connected-state terminal, a local cell of the terminal can be understood as a serving cell of the terminal. In addition, a neighboring cell in this embodiment of this disclosure is a neighboring cell of the local cell.

The configuration method in this embodiment of this disclosure can be applied to a network-side device.

For ease of understanding, the following describes some content included in the embodiments of this disclosure.

With development of UEs, an increasing quantity of sensors is integrated in the UEs, and functions of the sensors are growing more powerful. For example, in many cases and scenarios, with sensors, the UE can accurately know whether the UE itself is in a moving state, a moving speed, and related moving information. In addition, the UE may carry more sensors to obtain a status, environment information, or coverage information of the UE. Based on such information, behaviour of the UE can be better controlled and optimized, for example, measurement performed for the UE in an idle state and an inactive state can be optimized, thereby implementing power saving.

At present, UEs in different motion states (such as stationary UE, low-speed moving UE, or high-speed moving UE) trigger measurement on neighboring cells based on uniform conditions; and measurement on the local cell or the neighbouring cell of the UE is performed based on unified measurement requirements. That is, a trigger condition for measurement on a neighboring cell by the UE and a measurement requirement for cell measurement by the UE are unrelated to a motion status of the UE, an environment in which the UE is located, or a coverage. In other words, non-differentiated configuration is used. This is not good for power saving of some stationary or low-speed moving UEs if the channel environment does not change greatly.

For such type of UE, relaxation may be performed for RRM measurement of the UE. For example, a measurement period is extended, or the number of samples for layer 1 measurement is reduced. Whether the UE performs measurement relaxation may be determined based on a status of the UE or a threshold configured on the network side. However, a channel state of the UE may abruptly change; as a result, such measurement relaxation affects mobility of the UE. Therefore, it may be considered to combine a condition of such measurement relaxation with the existing S-measure. Measurement relaxation is performed only in a case that the UE is in a particularly good channel condition. In this way, measurement relaxation can not only implement power saving, but also does not affect mobility of the UE.

In the long term evolution (LTE) and new radio (NR) systems, configurations related to idle-state and inactive-state measurement, trigger conditions for neighboring cell measurement, connected-state related measurement configuration, and measurement reporting conditions are defined.

For determining of whether to measure intra-frequency neighboring cells, when a serving cell satisfies that a measured RSRP value Srxlev is greater than an intra-frequency measurement threshold $S_{IntrasearchP}$, and a measured RSRQ value Squal is greater than an intra-frequency measurement threshold $S_{IntraSearchQ}$, that is, when Srxlev>$S_{IntraSearchP}$ and Squal>$S_{IntrasearchQ}$, the UE chooses not to perform intra-frequency neighboring cell measurement; otherwise, the UE needs to perform intra-frequency neighboring cell measurement.

In inter-frequency and inter-radio access technology (Inter-RAT) scenarios, when another frequency and RAT have a higher priority than a serving frequency and RAT, the terminal performs neighboring cell measurement based on a defined measurement requirement. When another frequency and RAT have the same or a lower priority than the serving frequency and RAT, if the serving cell satisfies that a measured RSRP value Srxlev is greater than a non-intra-frequency measurement threshold $S_{nonIntraSearchP}$ and a measured RSRQ value Squal is greater than a non-intra-frequency measurement threshold $S_{nonIntraSearchQ}$, that is, Srxlev>$S_{nonIntraSearchP}$ and Squal>$S_{nonIntraSearchQ}$, the UE chooses not to perform neighboring-cell measurement; otherwise, the UE needs to perform neighboring-cell measurement.

The neighboring-cell measurement threshold is optionally configured on the network side. When the threshold is not configured and a measurement result of the local cell does not satisfy an S criterion for a plurality of times, neighboring-cell measurement is triggered.

In the connected state, based on a measurement result (such as a reference signal received power (RSRP) or a reference signal received quality (RSRQ)) of a special cell (SpCell) and a configured S-measure related threshold (S-measure Config), the terminal determines whether to perform corresponding measurement and measurement reporting. If the measurement result is lower than the configured threshold, the terminal performs calculation and reporting of the measurement result based on a measurement configuration and a measurement reporting configuration; otherwise, the terminal does not need to perform the corresponding measurement and measurement reporting.

Considering energy saving for the terminal, RRM measurement relaxation is introduced, for example, extending a measurement period or reducing the number of layer-1 measurement samples. Whether to perform RRM measurement relaxation is determined based on the status of the UE or the threshold configured by the network side. For example, when a channel condition of the UE is relatively good or the measurement result is greater than the threshold, measurement relaxation is performed; otherwise, measurement is performed based on an existing measurement requirement.

The following describes the measurement method in the embodiments of this disclosure.

Referring to FIG. 2, FIG. 2 is a flowchart of a measurement method according to an embodiment of this disclosure. As shown in FIG. 2, the measurement method may include the following steps 201 and 202.

Step 201: Obtain at least one radio resource management RRM measurement threshold.

In practical application, optionally, the obtaining at least one RRM measurement threshold includes:

receiving configuration information sent by a network-side device, where the configuration information is used to configure at least one RRM measurement threshold.

In specific implementation, in a case that the terminal is in a connected state, that is, the terminal is a connected-state terminal, the configuration information may be transmitted by using a radio resource control (RRC) dedicated message or a broadcast message, which is not limited thereto.

In a case that the terminal is in an idle state or an inactive state, that is, the terminal is an idle-state terminal or an inactive-state terminal, the configuration information may be transmitted by using an RRC release message, an RRC suspend message, or a broadcast message, which is not limited thereto.

In this way, the network-side device may determine the at least one radio resource management RRM measurement threshold based on an actual situation, and deliver the at least one RRM measurement threshold to the terminal, thereby improving flexibility of determining the at least one radio resource management RRM measurement threshold.

Certainly, it should be understood that in other implementations, the at least one radio resource management RRM measurement threshold may alternatively be specified in a protocol, so that the terminal can directly read the at least one radio resource management RRM measurement threshold from the protocol, thereby reducing signaling overheads.

It should be noted that, in this embodiment of this disclosure, optionally, the at least one RRM measurement threshold has a correspondence relationship with at least one of the following objects: a terminal, a cell, a frequency, a carrier, a band, or a bandwidth part (BWP).

During specific implementation, the at least one RRM measurement threshold may be any one of the following:

per-UE configuration, where the at least one RRM measurement threshold is separately configured for each UE;

per-cell configuration, where the at least one RRM measurement threshold is the same within a coverage of a cell;

per-frequency/carrier/band/BWP configuration, where the at least one RRM measurement threshold is the same within a coverage of a frequency/carrier/band/BWP; and per-UE per-frequency/carrier/band/BWP configuration, where the at least one RRM measurement threshold is the same for each UE within a coverage of a frequency/carrier/band/BWP.

In addition, the at least one radio resource management RRM measurement threshold may include a threshold and a delta threshold. Specifically, for a threshold included in the at least one radio resource management RRM measurement threshold, the terminal may directly compare the threshold with the measurement result. However, for a delta threshold included in the at least one radio resource management RRM measurement threshold, the terminal may not directly compare the delta threshold with the measurement result, but needs to combine the delta threshold with the threshold before performing comparison with the measurement result.

Step 202: Adjust RRM measurement based on an RRM measurement result for a local cell of the terminal and the at least one RRM measurement threshold.

During specific implementation, the terminal may compare the RRM measurement result for the local cell of the terminal with the at least one RRM measurement threshold, and then determine, based on a comparison result, whether to adjust the RRM measurement. Specifically, in a case that the comparison result satisfies a specific condition, RRM measurement may be adjusted; otherwise, RRM measurement is not adjusted, that is, RRM measurement is performed based on a normal measurement configuration and a measurement requirement.

It should be noted that in actual applications, the adjusting RRM measurement may be specifically implemented as:

adjusting RRM measurement for a first cell, where the first cell is at least one of the local cell and a neighboring cell.

In this embodiment of this disclosure, RRM measurement may be cell or beam measurement. In specific implementation, beam measurement may be implemented as: measurement performed on a synchronization signal block (SSB), a channel state information reference signal (CSI-RS), a demodulation reference signal (DMRS), or other reference signals.

The RRM measurement result may include: an RSRP, an RSRQ, a signal-to-noise and interference ratio (SINR), a channel quality indicator (CQI), or the like.

In the measurement method of this embodiment, the terminal obtains at least one radio resource management RRM measurement threshold, and adjusts RRM measurement based on the RRM measurement result for the local cell of the terminal and the at least one RRM measurement threshold. In this way, compared with the related art, flexibility of RRM measurement can be improved.

In this embodiment of this disclosure, the adjusting RRM measurement may specifically be implemented as: relaxing RRM measurement or enhancing RRM measurement. The relaxing RRM measurement may also be referred to as RRM measurement reduction, and the enhancing RRM measurement may also be referred to as RRM measurement enhancement. In addition, other names may be used in the standards, and may not affect this disclosure.

In this embodiment of this disclosure, optionally, the relaxing RRM measurement may include at least one of the following:

extending a period of RRM measurement;
 reducing the number of samples for RRM measurement;
 reducing the number of times of RRM measurement;
 reducing the number of cells for RRM measurement;
 reducing the number of beams for RRM measurement;
 reducing the number of reference signals for RRM measurement;
 reducing the number of frequencies for RRM measurement; and
 using an additional reference signal for RRM measurement.

In specific implementation, extending the period of RRM measurement may be implemented as: extending a layer (L)1, L2, or L3 measurement period for RRM measurement. Reducing the number of samples for RRM measurement may be specifically implemented as: reducing the number of L1, L2, or L3 measurement samples for RRM measurement. Reducing the number of times of RRM measurement may be specifically implemented as: in a period of time, no RRM measurement is performed (that is, the number of times of RRM measurement is reduced to 0) or the number of times of RRM measurement is reduced. Reducing the number of frequencies for RRM measurement may be specifically implemented as: reducing the number of inter-frequency frequencies for RRM measurement.

A measurement period of an additional reference signal (RS) is different from a measurement period of a first reference signal. For example, the measurement period of the additional RS is 40 milliseconds (ms), and the measurement period of the first reference signal is 20 ms. In this way, using the additional RS for RRM measurement can indirectly reduce the number of times of RRM measurement. In this embodiment of this disclosure, the first reference signal can be understood as an existing measurement reference signal configured by the network-side device, such as an SSB, a CSI-RS, or a DMRS. The additional reference signal may be of the same type as the first reference signal, namely, an SSB, a CSI-RS, a DMRS, or the like; or may be different, namely, other newly designed reference signals. Optionally, the additional reference signal may be specially configured for RRM measurement of the terminal.

It should be noted that a specific quantity for extension or reduction is not limited in this disclosure, and may be specifically determined based on an actual requirement.

It can be learned that the relaxing RRM measurement may directly or indirectly reduce the number of times of RRM measurement, thereby reducing power consumption of the terminal.

Optionally, the enhancing RRM measurement includes at least one of the following:

shortening a period of RRM measurement;
 increasing the number of samples for RRM measurement;
 increasing the number of times of RRM measurement;
 increasing the number of cells for RRM measurement;
 increasing the number of beams for RRM measurement;
 increasing the number of reference signals for RRM measurement;

increasing the number of frequencies for RRM measurement; and
 using an additional reference signal and a first reference signal for RRM measurement.

In specific implementation, shortening the period of RRM measurement may be implemented as: shortening a layer (L)1, L2, or L3 measurement period for RRM measurement. Increasing the number of samples for RRM measurement may be specifically implemented as: increasing the number of L1, L2, or L3 measurement samples for RRM measurement. Increasing the number of times of RRM measurement may be specifically implemented as: in a period of time, the number of times of RRM measurement is increased. Increasing the number of frequencies for RRM measurement may be specifically implemented as: increasing the number of inter-frequency frequencies for RRM measurement.

Compared to the related art in which only the first reference signal is used for RRM measurement, RRM measurement by using the additional reference signal and the first reference signal can increase the number of times of RRM measurement.

It can be learned that the enhancing RRM measurement can directly or indirectly increase the number of times of RRM measurement, thereby improving reliability of determining the signal quality between the terminal and the network-side device, and improving measurement accuracy and mobility performance of the terminal.

It can be known from the foregoing description that the terminal can adjust RRM measurement in the case that the comparison result between the RRM measurement result for the local cell of the terminal and the at least one RRM measurement threshold satisfies a specific condition. For different implementations of adjusting RRM measurement, adjusting RRM measurement is performed only when different conditions are satisfied. Optionally, the adjusting RRM measurement based on an RRM measurement result for a local cell of the terminal and the at least one RRM measurement threshold includes at least one of the following:

relaxing RRM measurement in a case that a comparison result satisfies a first condition; and
 enhancing RRM measurement in a case that the comparison result satisfies a second condition.

The comparison result is a comparison result between the RRM measurement result and the at least one RRM measurement threshold.

It should be understood that the first condition and the second condition are two different conditions. In a case that the comparison result satisfies the first condition, it indicates that the comparison result does not satisfy the second condition. Similarly, in a case that the comparison result satisfies the second condition, it indicates that the comparison result does not satisfy the first condition.

Therefore, in this embodiment of this disclosure, when the comparison result does not satisfy the first condition, or when the comparison result satisfies the second condition, the terminal may not relax RRM measurement. Specifically, the terminal may perform RRM measurement based on a normal measurement configuration and a measurement requirement, or the terminal may enhance RRM measurement.

In the case that the comparison result does not satisfy the second condition, or in the case that the comparison result satisfies the first condition, the terminal may not enhance RRM measurement. Specifically, the terminal may perform RRM measurement based on a normal measurement configuration and a measurement requirement, or the terminal may relax RRM measurement.

For ease of understanding, the following describes two scenarios in which the adjusting RRM measurement may be specifically implemented as: relaxing RRM measurement or enhancing RRM measurement.

Scenario 1. Adjusting RRM measurement is specifically implemented as relaxing RRM measurement.

In this scenario, for the at least one RRM measurement threshold that includes different content, the relaxing RRM measurement in a case that a comparison result satisfies a first condition may be implemented in different manners, which are specifically described as follows:

Implementation 1: The at least one RRM measurement threshold includes: a first threshold.

In this implementation, the relaxing RRM measurement in a case that a comparison result satisfies a first condition may include:

in a case that the comparison result is that the RRM measurement result is greater than or equal to the first threshold, relaxing RRM measurement.

In addition, in a case that the comparison result is that the RRM measurement result is less than the first threshold, RRM measurement may not be relaxed. For example, RRM measurement is performed based on a normal measurement configuration and a measurement requirement, or the terminal may enhance RRM measurement.

In this way, in this implementation, in the case that the comparison result is that the RRM measurement result is greater than or equal to the first threshold, RRM measurement is relaxed, thereby improving flexibility of RRM measurement and reducing power consumption of the terminal.

Implementation 2: The at least one RRM measurement threshold includes: a first threshold and a second threshold.

In this implementation, the relaxing RRM measurement in a case that a comparison result satisfies a first condition may include:

in a case that the comparison result is that the RRM measurement result is greater than or equal to a first target value, relaxing RRM measurement; where the first target value is a maximum value of the first threshold and the second threshold.

In addition, in a case that the comparison result is that the RRM measurement result is less than the first target value, RRM measurement may not be relaxed. For example, RRM measurement is performed based on a normal measurement configuration and a measurement requirement, or the terminal may enhance RRM measurement.

It should be noted that in actual application, the number of the second thresholds may be greater than or equal to 1.

In this way, in this implementation, in the case that the comparison result is that the RRM measurement result is greater than or equal to the first target value, RRM measurement is relaxed, thereby improving flexibility of RRM measurement and reducing power consumption of the terminal.

Implementation 3: The at least one RRM measurement threshold includes: a first threshold and a first delta threshold.

In this implementation, the relaxing RRM measurement in a case that a comparison result satisfies a first condition may include:

in a case that the comparison result is that the RRM measurement result is greater than or equal to a second target value, relaxing RRM measurement; where in a case that the first delta threshold is greater than or equal to 0, the second target value is a sum of the first threshold and the first delta threshold; or in a case that the first delta threshold is less than 0, the second target value is the first threshold.

In addition, in a case that the comparison result is that the RRM measurement result is less than the second target value, RRM measurement may not be relaxed. For example, RRM measurement is performed based on a normal measurement configuration and a measurement requirement, or the terminal may enhance RRM measurement.

It should be noted that in actual application, the number of the first delta thresholds may be greater than or equal to 1. Specifically, in a case that the number of the first delta thresholds is greater than 1, N first delta thresholds are greater than or equal to 0, and N is an integer greater than 1, the second target value may be a sum of the first threshold and a maximum value of the N first delta thresholds.

In this way, in this implementation, in the case that the comparison result is that the RRM measurement result is greater than or equal to the second target value, RRM measurement is relaxed, thereby improving flexibility of RRM measurement and reducing power consumption of the terminal.

In this scenario, optionally, the first threshold may be an S-measure threshold. Specifically, for an idle-state or inactive-state terminal, the S-measure threshold is used to determine whether to enable neighboring-cell measurement; for a connected-state terminal, the S-measure threshold is used to determine whether to execute measurement reporting. Certainly, the first threshold may alternatively be a threshold different from the S-measure threshold, and may be specifically set based on an actual status, which is not limited in this embodiment of this disclosure.

In addition, it can be known from the foregoing content that the adjusting RRM measurement may include: adjusting measurement for a first cell. However, in the case that the first threshold is the S-measure threshold, the terminal may determine a specific implementation of the first cell based on the comparison result between the RRM measurement result and the first threshold.

For implementation 2 in this scenario, optionally, in a case that the first threshold is the S-measure threshold and the first threshold is greater than or equal to the second threshold, the relaxing RRM measurement in a case that a comparison result satisfies a first condition includes at least one of the following:

in a case that the comparison result is that the RRM measurement result is greater than or equal to the first threshold, relaxing RRM measurement for the local cell; and in a case that the comparison result is that the RRM measurement result is greater than or equal to the second threshold and less than the first threshold, relaxing RRM measurement for the local cell and a neighboring cell.

In addition, in a case that the comparison result is that the RRM measurement result is less than the second threshold, RRM measurement may not be relaxed. For example, RRM measurement is performed based on a normal measurement configuration and a measurement requirement, or the terminal may enhance RRM measurement.

In this way, when the terminal relaxes RRM measurement, the comparison result needs to be greater than or equal to the S-measure threshold, indicating a relatively good channel condition for the terminal. Therefore, the terminal relaxes RRM measurement, thereby affecting mobility of the terminal and reducing power consumption of the terminal.

For implementation 3 in this scenario, optionally, in a case that the first threshold is the S-measure threshold and the first delta threshold is less than 0, the relaxing RRM measurement in a case that a comparison result satisfies a first condition includes at least one of the following:

in a case that the comparison result is that the RRM measurement result is greater than or equal to the first threshold, relaxing RRM measurement for the local cell; and in a case that the comparison result is that the RRM measurement result is greater than or equal to the sum of the first threshold and the first delta threshold and less than the first threshold, relaxing RRM measurement for the local cell and a neighboring cell.

In addition, in a case that the comparison result is that the RRM measurement result is less than the sum of the first threshold and the first delta threshold, RRM measurement may not be relaxed. For example, RRM measurement is performed based on a normal measurement configuration and a measurement requirement, or the terminal may enhance RRM measurement.

In this way, when the terminal relaxes RRM measurement, the comparison result needs to be greater than or equal to the S-measure threshold, indicating a relatively good channel condition for the terminal. Therefore, the terminal relaxes RRM measurement, thereby affecting mobility of the terminal and reducing power consumption of the terminal.

Scenario 2. Adjusting RRM measurement is specifically implemented as enhancing RRM measurement.

In this scenario, for the at least one RRM measurement threshold that includes different content, the enhancing RRM measurement in a case that a comparison result satisfies a second condition may be implemented in different manners, which are specifically described as follows:

Implementation 1: The at least one RRM measurement threshold includes: a third threshold.

In this implementation, the enhancing RRM measurement in a case that the comparison result satisfies a second condition may include:

in a case that the comparison result is that the RRM measurement result is less than the third threshold, enhancing RRM measurement.

In addition, in a case that the comparison result is that RRM measurement result is greater than or equal to the third threshold, RRM measurement may not be enhanced. For example, RRM measurement is performed based on a normal measurement configuration and a measurement requirement, or the terminal may relax RRM measurement.

In this way, in this implementation, in the case that the comparison result is that the RRM measurement result is greater than or equal to the third threshold, RRM measurement is enhanced, thereby improving flexibility of RRM measurement, improving reliability of determining the signal quality between the terminal and the network-side device, and improving measurement accuracy and mobility performance of the terminal.

Implementation 2: The at least one RRM measurement threshold includes: a third threshold and a fourth threshold.

In this implementation, the enhancing RRM measurement in a case that the comparison result satisfies a second condition may include:

in a case that the comparison result is that the RRM measurement result is less than a third target value, enhancing RRM measurement.

The third target value is a minimum value of the third threshold and the fourth threshold.

In addition, in a case that the comparison result is that RRM measurement result is greater than or equal to the third target value, RRM measurement may not be enhanced. For example, RRM measurement is performed based on a normal measurement configuration and a measurement requirement, or the terminal may relax RRM measurement.

It should be noted that in actual application, the number of the fourth thresholds may be greater than or equal to 1.

In this way, in this implementation, in the case that the comparison result is that the RRM measurement result is greater than or equal to the third target value, RRM measurement is enhanced, thereby improving flexibility of RRM measurement, improving reliability of determining the signal quality between the terminal and the network-side device, and improving measurement accuracy and mobility performance of the terminal.

Implementation 3: The at least one RRM measurement threshold includes: a third threshold and a second delta threshold.

In this implementation, the enhancing RRM measurement in a case that the comparison result satisfies a second condition may include:

in a case that the comparison result is that the RRM measurement result is less than a fourth target value, enhancing RRM measurement; where in a case that the second delta threshold is greater than or equal to 0, the fourth target value is the third threshold; or in a case that the second delta threshold is less than 0, the fourth target value is a sum of the third threshold and the second delta threshold.

In addition, in a case that the comparison result is that RRM measurement result is less than the fourth target value, RRM measurement may not be enhanced. For example, RRM measurement is performed based on a normal measurement configuration and a measurement requirement, or the terminal may relax RRM measurement.

It should be noted that in actual application, the number of the second delta thresholds may be greater than or equal to 1. Specifically, in a case that the number of the second delta thresholds is greater than 1, M second delta thresholds are greater than or equal to 0, and M is an integer greater than 1, the fourth target value may be a sum of the third threshold and a minimum value of the M second delta thresholds.

In this way, in this implementation, in the case that the comparison result is that the RRM measurement result is greater than or equal to the fourth target value, RRM measurement is enhanced, thereby improving flexibility of RRM measurement, improving reliability of determining the signal quality between the terminal and the network-side device, and improving measurement accuracy and mobility performance of the terminal.

In this scenario, optionally, the third threshold may be an S-measure threshold. Specifically, for an idle-state or inactive-state terminal, the S-measure threshold is used to determine whether to enable neighboring-cell measurement; for a connected-state terminal, the S-measure threshold is used to determine whether to execute measurement reporting. Certainly, the third threshold may alternatively be a threshold different from the S-measure threshold, and may be specifically set based on an actual status, which is not limited in this embodiment of this disclosure.

In addition, it can be known from the foregoing content that the adjusting RRM measurement may include: adjusting measurement for a first cell. However, in the case that the first threshold is the S-measure threshold, the terminal may determine a specific implementation of the first cell based on the comparison result between the RRM measurement result and the first threshold.

For implementation 2 in this scenario, optionally, in a case that the third threshold is an S-measure threshold and the third threshold is less than the fourth threshold, the enhancing RRM measurement in a case that the comparison result satisfies a second condition includes at least one of the following:

in a case that the comparison result is that the RRM measurement result is less than the third threshold, enhancing RRM measurement for the local cell and a neighboring cell; and in a case that the comparison result is that the RRM measurement result is greater than or equal to the third threshold and less than the fourth threshold, enhancing RRM measurement for the local cell.

In this way, in the case that the comparison result is that the RRM measurement result is less than the third threshold, RRM measurement for the neighboring cell may be further enhanced, thereby improving reliability of determining the signal quality between the terminal and the network-side device, and improving measurement accuracy and mobility performance of the terminal.

For implementation 3 in this scenario, optionally, in a case that the third threshold is an S-measure threshold and the second delta threshold is greater than 0, the enhancing RRM measurement in a case that the comparison result satisfies a second condition includes at least one of the following:

in a case that the comparison result is that the RRM measurement result is less than the sum of the third threshold and the second delta threshold, enhancing RRM measurement for the local cell and a neighboring cell; and in a case that the comparison result is that the RRM measurement result is less than the sum of the third threshold and the second delta threshold and greater than or equal to the third threshold, enhancing RRM measurement for the local cell.

In this way, in the case that the comparison result is that the RRM measurement result is less than the sum of the third threshold and the second delta threshold, RRM measurement for the neighboring cell may be further enhanced, thereby improving reliability of determining the signal quality between the terminal and the network-side device, and improving measurement accuracy and mobility performance of the terminal.

In this embodiment of this disclosure, the method of relaxing RRM measurement and the method of enhancing RRM measurement can be implemented separately or in combination. For implementation in a combined manner, for ease of understanding, using implementation 1 of scenario 1 and implementation 1 of scenario 2 as examples for description, the following cases may be included:

Case 1: The first threshold is equal to the third threshold.

In this case, the following behaviors may be included:

in a case that the comparison result is that the RRM measurement result is greater than or equal to the first threshold, relaxing RRM measurement; and in a case that the comparison result is that the RRM measurement result is less than the first threshold, enhancing RRM measurement.

Case 2: The first threshold is greater than the third threshold.

In this case, the following behaviors may be included:

in a case that the comparison result is that the RRM measurement result is greater than or equal to the first threshold, relaxing RRM measurement;

in a case that the comparison result is that the RRM measurement result is less than the first threshold and greater than or equal to the third threshold, performing RRM measurement based on a normal measurement configuration and a measurement requirement; and in a case that the comparison result is that the RRM measurement result is less than the third threshold, enhancing RRM measurement.

It should be understood that for implementation 2 in scenario 1 and implementation 2 in scenario 2, in one implementation, the first threshold may be equal to the third threshold, and the second threshold may be equal to the fourth threshold; in another implementation, the first threshold may be not equal to the third threshold, and the second threshold may be not equal to the fourth threshold, which may be specifically determined based on an actual requirement. This is not limited in this embodiment of this disclosure.

For implementation 3 in scenario 1 and implementation 3 in scenario 2, in one implementation, the first threshold may be equal to the third threshold, and the first delta threshold may be equal to the second delta threshold; in another implementation, the first threshold may be not equal to the third threshold, and the first delta threshold may be not equal to the second delta threshold, which may be specifically determined based on an actual requirement. This is not limited in this embodiment of this disclosure.

It should be noted that this embodiment of this disclosure does not limit a mobile communication system to which the embodiments of this disclosure are applicable. For example, the embodiments of this disclosure can be applied to a fifth generation ($5^{th}$ Generation, 5G) mobile communications system, or can be applied to a future mobile communication system, such as a sixth generation ($6^{th}$ Generation, 6G) mobile communications system.

In addition, a plurality of optional implementations described in this embodiment of this disclosure may be implemented in combination or may be implemented separately, which is not limited in this embodiment of this disclosure.

For the implementation in a combined manner, that adjusting RRM measurement is implemented as relaxing RRM measurement is used as an example for description.

The terminal receives a measurement relaxation determining related parameter (equivalent to at least one RRM measurement threshold in this embodiment of this disclosure) configured by the network side, and determines, based on the measurement relaxation determining related parameter and/or an S-measure configuration threshold, whether to relax RRM measurement. Specifically, the following cases may be included:

Case 1: A measurement determining related parameter includes a measurement relaxation determining threshold (equivalent to the second threshold in this embodiment of this disclosure); in this case, whether to relax RRM measurement is determined according to the following rules:

1. If the measurement result is not less than max{S-measure determining threshold, measurement relaxation determining threshold}, the terminal performs measurement relaxation.

In other words, if the measurement result is not less than the S-measure determining threshold, and the measurement result is not less than the measurement relaxation determining threshold, the terminal performs measurement relaxation.

2. If the measurement result is less than max{S-measure determining threshold, measurement relaxation determining threshold}, the terminal does not perform measurement relaxation or performs RRM measurement based on a normal measurement configuration and a measurement requirement.

In other words, if the measurement result is less than the S-measure determining threshold, or the measurement result is less than the measurement relaxation determining threshold, the terminal performs measurement relaxation.

Case 2: The measurement determining related parameter includes a measurement relaxation determining delta threshold (equivalent to the first delta threshold in this embodiment of this disclosure); in this case, whether to relax RRM measurement is determined according to the following rules:

1. if the measurement result is not less than the S-measure determining threshold PLUS delta threshold, the terminal performs measurement relaxation; or 2. if the measurement result is less than the S-measure determining threshold PLUS delta threshold, the terminal does not perform measurement relaxation or performs RRM measurement based on a normal measurement configuration and a measurement requirement.

Case 3: The measurement determining related parameter includes a measurement relaxation determining threshold (equivalent to the first threshold in this embodiment of this disclosure); in this case, whether to relax RRM measurement is determined according to the following rules:

1. if the measurement result is not less than the measurement relaxation determining threshold, the terminal performs measurement relaxation; or 2. if the measurement result is less than the measurement relaxation determining threshold, the terminal does not perform measurement relaxation or performs RRM measurement based on a normal measurement configuration and a measurement requirement.

Case 4: The measurement determining related parameter includes a measurement relaxation determining threshold; in this case, whether to perform RRM measurement relaxation is determined according to the following rules:

In a case that the measurement relaxation determining threshold is not less than the S-measure determining threshold or the measurement relaxation determining delta threshold≥0:

1. if the measurement result is not less than the measurement relaxation determining threshold or the measurement result is not less than the S-measure determining threshold PLUS delta threshold, the terminal performs measurement relaxation; or 2. if the measurement result is less than the measurement relaxation determining threshold or the measurement result is less than the S-measure determining threshold PLUS delta threshold, the terminal does not perform measurement relaxation or performs RRM measurement based on a normal measurement configuration and a measurement requirement.

In a case that the measurement relaxation determining threshold is less than the S-measure determining threshold or the measurement relaxation determining delta threshold is less than 0:

1. if the measurement result is not less than the measurement relaxation determining threshold or the measurement result is not less than the S-measure determining threshold PLUS delta threshold, and the measurement result is not less than the S-measure determining threshold, the terminal performs measurement relaxation on the serving cell or a cell on which the terminal camps;

2. if the measurement result is not less than the measurement relaxation determining threshold or the measurement result is not less than the S-measure determining threshold PLUS delta threshold, and the measurement result is not less than the S-measure determining threshold, the terminal performs measurement relaxation on the serving cell or the cell on which the terminal camps, and the neighboring cell; or 3. if the measurement result is less than the S-measure determining threshold, the terminal does not perform measurement relaxation or performs RRM measurement based on a normal measurement configuration and a measurement requirement.

A measurement relaxation determining related configuration may be:

1. per-UE configuration, where the network configures, for each UE, a separate measurement relaxation determining related parameter;

2. per-cell configuration, where the measurement relaxation determining related parameter configured by the network is the same within a coverage of a cell;

3. per-frequency/carrier/band/BWP configuration, where the measurement relaxation determining related parameter configured by the network is the same within a coverage of a frequency/carrier/band/BWP; and 4. per-UE per-frequency/carrier/band/BWP configuration, where the measurement relaxation determining related parameter configured by the network for each UE is the same within a coverage of a frequency/carrier/band/BWP.

Further, the RRM measurement relaxation includes: RRM measurement relaxation in a connected state, an idle state, and an inactive state. RRM measurement relaxation includes:

1. time-domain RRM measurement relaxation, that is, extending an L1 or L3 measurement period for RRM measurement;

2. time-domain RRM measurement relaxation, that is, reducing the number of L1 or L3 measurement samples for RRM measurement;

3. performing no RRM measurement or less RRM measurement in a period of time;

4. reducing the number of cells for RRM measurement;

5. reducing the number of inter-frequency frequencies for RRM measurement; or 6. using an additional reference signal additional RS for measurement.

For the measurement relaxation in the connected state, the measurement relaxation determining related parameter (threshold or delta threshold) may be delivered by using an RRC dedicated message or broadcast message.

For the measurement relaxation in the idle/inactive state, the measurement relaxation determining related parameter (threshold or delta threshold) may be delivered by using an RRC release/suspend message or broadcast message.

The measurement results include: RSRP, RSRQ, SINR, CQI, or the like.

The measurement includes cell or beam measurement. The beam measurement includes: measurement on SSB, CSI-RS, DMRS, or other reference signals.

In this embodiment of this disclosure, a measurement relaxation condition may be determined based on the S-measure threshold and the delta configuration. In addition, in this embodiment of this disclosure, a measurement relaxation condition may be determined when the measurement relaxation determining threshold configuration is improper. In this embodiment of this disclosure, power can be saved in measurement relaxation, and impact of improper network configuration on mobility of the UE can be further avoided.

Referring to FIG. 3, FIG. 3 is a flowchart of a configuration method according to an embodiment of this disclosure. As shown in FIG. 3, the configuration method may include the following steps.

Step 301: Send configuration information, where the configuration information is used to configure at least one RRM measurement threshold, and the at least one RRM measurement threshold is used to adjust RRM measurement.

In this embodiment, optionally, the network-side device may also send indication information used for indicating the terminal to adjust RRM measurement by using the at least one RRM measurement threshold. In this way, after receiving the configuration information and indication information, the terminal may adjust RRM measurement by using the at least one RRM measurement threshold, thereby improving flexibility of RRM measurement.

Certainly, in some embodiments, the network-side device may alternatively not send indication information. In this implementation, after receiving the configuration message, the terminal may determine, based on its own requirement, whether to adjust RRM measurement by using the at least one RRM measurement threshold, thereby reducing signaling overheads.

It should be understood that, for content included in the at least one RRM measurement threshold in this embodiment, reference may be made to the description in the embodiment of the measurement method applied to the terminal. Details are not repeated herein.

It should be noted that this embodiment is used as an implementation of the network-side device corresponding to the foregoing method embodiment. Therefore, reference may be made to the related description in the foregoing method embodiment, and the same beneficial effects can be achieved. To avoid repetition, details are not described herein again.

Referring to FIG. 4, FIG. 4 is a first structural diagram of a terminal according to an embodiment of this disclosure. As shown in FIG. 4, the terminal 400 includes:

an obtaining module 401, configured to obtain at least one radio resource management RRM measurement threshold; and an adjusting module 402, configured to adjust RRM measurement based on an RRM measurement result for a local cell of the terminal and the at least one RRM measurement threshold.

Optionally, the adjusting module 402 is specifically configured to perform at least one of the following operations:

relaxing RRM measurement in a case that a comparison result satisfies a first condition; and enhancing RRM measurement in a case that the comparison result satisfies a second condition.

The comparison result is a comparison result between the RRM measurement result and the at least one RRM measurement threshold.

Optionally, the adjusting module 402 is specifically configured to: in a case that the comparison result satisfies the first condition, perform at least one of the following operations:

extending a period of RRM measurement;

reducing the number of samples for RRM measurement;

reducing the number of times of RRM measurement;

reducing the number of cells for RRM measurement;

reducing the number of beams for RRM measurement;

reducing the number of reference signals for RRM measurement;

reducing the number of frequencies for RRM measurement; and using an additional reference signal for RRM measurement.

Optionally, the adjusting module 402 is specifically configured to: in a case that the comparison result satisfies the second condition, perform at least one of the following operations:

shortening a period of RRM measurement;

increasing the number of samples for RRM measurement;

increasing the number of times of RRM measurement;

increasing the number of cells for RRM measurement;

increasing the number of beams for RRM measurement;

increasing the number of reference signals for RRM measurement;

increasing the number of frequencies for RRM measurement; and using an additional reference signal and a first reference signal for RRM measurement.

Optionally, the adjusting unit 402 is specifically configured to:

adjust RRM measurement for a first cell based on the RRM measurement result for the local cell of the terminal and the at least one RRM measurement threshold, where the first cell is at least one of the local cell and a neighboring cell.

Optionally, the at least one RRM measurement threshold includes: a first threshold.

The adjusting module 402 is specifically configured to:

in a case that the comparison result is that the RRM measurement result is greater than or equal to the first threshold, relax RRM measurement.

Optionally, the at least one RRM measurement threshold includes: a first threshold and a second threshold.

The adjusting module 402 is specifically configured to:

in a case that the comparison result is that the RRM measurement result is greater than or equal to the first target value, relax RRM measurement.

The first target value is a maximum value of the first threshold and the second threshold.

Optionally, the at least one RRM measurement threshold includes: a first threshold and a first delta threshold.

The adjusting module 402 is specifically configured to:

in a case that the comparison result is that the RRM measurement result is greater than or equal to a second target value, relax RRM measurement.

In a case that the first delta threshold is greater than or equal to 0, the second target value is a sum of the first threshold and the first delta threshold; or in a case that the first delta threshold is less than 0, the second target value is the first threshold.

Optionally, the first threshold is an S-measure threshold.

Optionally, in a case that the first threshold is the S-measure threshold and the first threshold is greater than or equal to the second threshold, the adjusting module 402 is specifically configured to perform at least one of the following operations:

in a case that the comparison result is that the RRM measurement result is greater than or equal to the first threshold, relaxing RRM measurement for the local cell; and in a case that the comparison result is that the RRM measurement result is greater than or equal to the second threshold and less than the first threshold, relaxing RRM measurement for the local cell and a neighboring cell.

Optionally, in a case that the first threshold is the S-measure threshold and the first delta threshold is less than 0, the adjusting module 402 is specifically configured to perform at least one of the following operations:

in a case that the comparison result is that the RRM measurement result is greater than or equal to the first threshold, relaxing RRM measurement for the local cell; and in a case that the comparison result is that the RRM measurement result is greater than or equal to the sum of the first threshold and the first delta threshold and less than the first threshold, relaxing RRM measurement for the local cell and a neighboring cell.

Optionally, the at least one RRM measurement threshold includes: a third threshold.

The adjusting module 402 is specifically configured to:

in a case that the comparison result is that the RRM measurement result is less than the third threshold, enhance RRM measurement.

Optionally, the at least one RRM measurement threshold includes: a third threshold and a fourth threshold.

The adjusting module 402 is specifically configured to:

in a case that the comparison result is that the RRM measurement result is less than a third target value, enhance RRM measurement.

The third target value is a minimum value of the third threshold and the fourth threshold.

Optionally, the at least one RRM measurement threshold includes: a third threshold and a second delta threshold.

The adjusting module 402 is specifically configured to:

in a case that the comparison result is that the RRM measurement result is less than a fourth target value, enhance RRM measurement.

In a case that the second delta threshold is greater than or equal to 0, the fourth target value is the third threshold; or in a case that the second delta threshold is less than 0, the fourth target value is a sum of the third threshold and the second delta threshold.

Optionally, the third threshold is an S-measure threshold.

Optionally, in a case that the third threshold is the S-measure threshold and the third threshold is less than the fourth threshold, the adjusting module 402 is specifically configured to perform at least one of the following operations:

in a case that the comparison result is that the RRM measurement result is less than the third threshold, enhancing RRM measurement for the local cell and a neighboring cell; and in a case that the comparison result is that the RRM measurement result is greater than or equal to the third threshold and less than the fourth threshold, enhancing RRM measurement for the local cell.

Optionally, in a case that the third threshold is the S-measure threshold and the second delta threshold is greater than 0, the adjusting module 402 is specifically configured to perform at least one of the following operations:

in a case that the comparison result is that the RRM measurement result is less than the sum of the third threshold and the second delta threshold, enhancing RRM measurement for the local cell and a neighboring cell; and in a case that the comparison result is that the RRM measurement result is less than the sum of the third threshold and the second delta threshold and greater than or equal to the third threshold, enhancing RRM measurement for the local cell.

Optionally, the obtaining module 401 is specifically configured to:

receive configuration information sent by a network-side device, where the configuration information is used to configure at least one RRM measurement threshold.

Optionally, the at least one RRM measurement threshold has a correspondence relationship with at least one of the following objects: a terminal, a cell, a frequency, a carrier, a band, or a bandwidth part BWP.

The terminal 400 is capable of implementing the processes implemented by the terminal in the method embodiment of this disclosure, with the same beneficial effects achieved. To avoid repetition, details are not described herein again.

Figure 5:
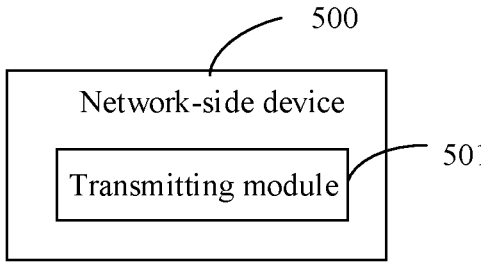
FIG. 5 is a first structural diagram of a network-side device according to an embodiment of this disclosure.

Referring to FIG. 5, FIG. 5 is a first structural diagram of a network-side device according to an embodiment of this disclosure. As shown in FIG. 5, the network-side device 500 includes:

a transmitting module 501, configured to send configuration information, where the configuration information is used to configure at least one RRM measurement threshold, and the at least one RRM measurement threshold is used to adjust RRM measurement.

The network-side device 500 is capable of implementing the processes implemented by the network-side device in the method embodiment of this disclosure, with the same beneficial effects achieved. To avoid repetition, details are not described herein again.

Figure 6:
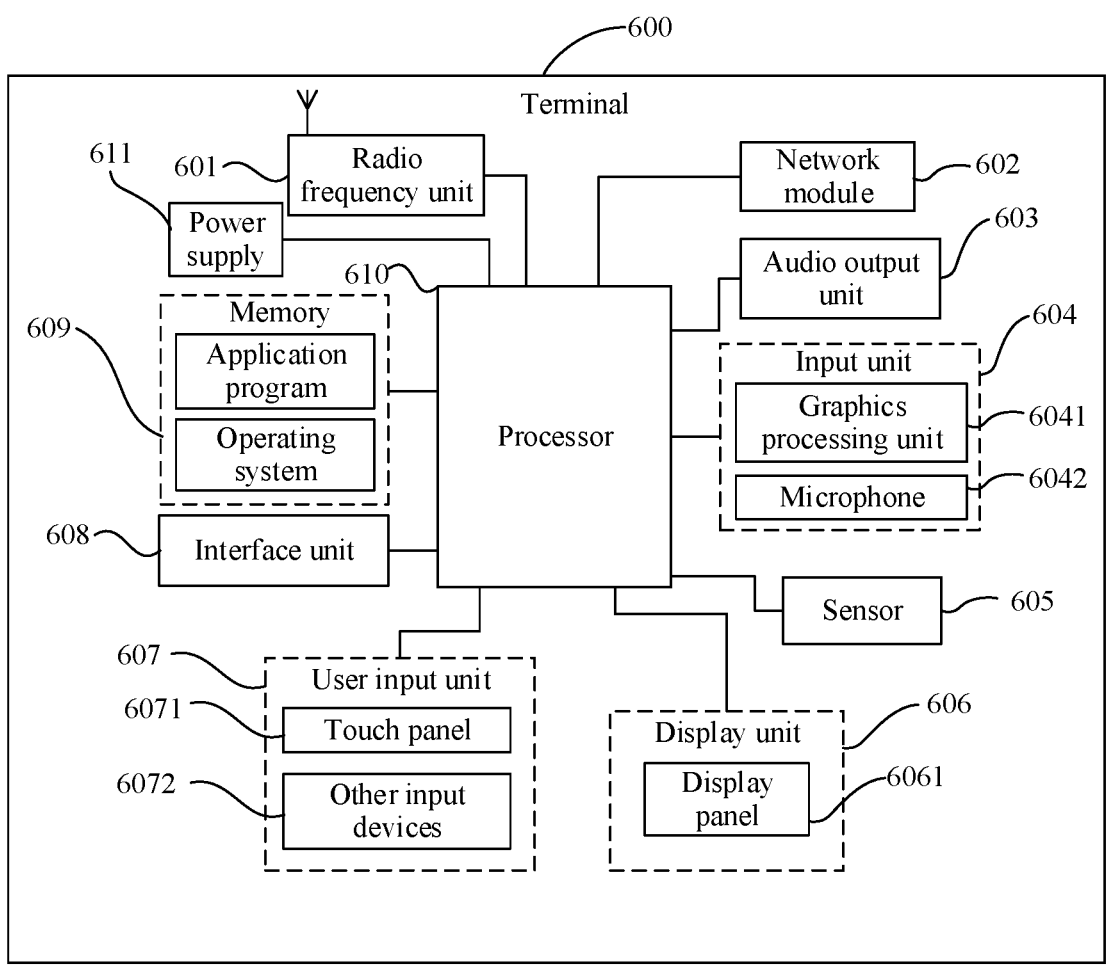
FIG. 6 is a second structural diagram of a terminal according to an embodiment of this disclosure.

Referring to FIG. 6, FIG. 6 is a second structural diagram of a terminal according to an embodiment of this disclosure. The terminal may be a schematic diagram of a hardware structure of a terminal that implements the embodiments of this disclosure. As shown in FIG. 6, the terminal 600 includes but is not limited to components such as a radio frequency unit 601, a network module 602, an audio output unit 603, an input unit 604, a sensor 605, a display unit 606, a user input unit 607, an interface unit 608, a memory 609, a processor 610, and a power supply 611. A person skilled in the art may understand that the structure of the terminal shown in FIG. 6 does not constitute any limitation on the terminal. The terminal may include more or fewer components than those shown in the figure, or a combination of some components, or the components disposed differently. In this embodiment of this disclosure, the terminal includes but is not limited to a mobile phone, a tablet computer, a laptop computer, a personal digital assistant, an in-vehicle terminal, a wearable device, a pedometer, and the like.

The processor 610 is configured to:

obtain at least one radio resource management RRM measurement threshold; and adjust RRM measurement based on an RRM measurement result for a local cell of the terminal and the at least one RRM measurement threshold.

Optionally, the processor 610 is further configured to perform at least one of the following operations:

relaxing RRM measurement in a case that a comparison result satisfies a first condition; and enhancing RRM measurement in a case that the comparison result satisfies a second condition.

The comparison result is a comparison result between the RRM measurement result and the at least one RRM measurement threshold.

Optionally, the processor 610 is further configured to: in a case that the comparison result satisfies the first condition, perform at least one of the following operations:

extending a period of RRM measurement;

reducing the number of samples for RRM measurement;

reducing the number of times of RRM measurement;

reducing the number of cells for RRM measurement;

reducing the number of beams for RRM measurement;

reducing the number of reference signals for RRM measurement;

reducing the number of frequencies for RRM measurement; and using an additional reference signal for RRM measurement.

Optionally, the processor 610 is further configured to: in a case that the comparison result satisfies the second condition, perform at least one of the following operations:

shortening a period of RRM measurement;

increasing the number of samples for RRM measurement;

increasing the number of times of RRM measurement;

increasing the number of cells for RRM measurement;

increasing the number of beams for RRM measurement;

increasing the number of reference signals for RRM measurement;

increasing the number of frequencies for RRM measurement; and using an additional reference signal and a first reference signal for RRM measurement.

Optionally, the processor 610 is further configured to:

adjust RRM measurement for a first cell based on the RRM measurement result for the local cell of the terminal and the at least one RRM measurement threshold, where the first cell is at least one of the local cell and a neighboring cell.

Optionally, the at least one RRM measurement threshold includes: a first threshold.

The processor 610 is further configured to:

in a case that the comparison result is that the RRM measurement result is greater than or equal to the first threshold, relax RRM measurement.

Optionally, the at least one RRM measurement threshold includes: a first threshold and a second threshold.

The processor 610 is further configured to:

in a case that the comparison result is that the RRM measurement result is greater than or equal to the first target value, relax RRM measurement.

The first target value is a maximum value of the first threshold and the second threshold.

Optionally, the at least one RRM measurement threshold includes: a first threshold and a first delta threshold.

The processor 610 is further configured to:

in a case that the comparison result is that the RRM measurement result is greater than or equal to a second target value, relax RRM measurement.

In a case that the first delta threshold is greater than or equal to 0, the second target value is a sum of the first threshold and the first delta threshold; or

in a case that the first delta threshold is less than 0, the second target value is the first threshold.

Optionally, the first threshold is an S-measure threshold.

Optionally, in a case that the first threshold is the S-measure threshold and the first threshold is greater than or equal to the second threshold, the processor 610 is further configured to perform at least one of the following operations:

in a case that the comparison result is that the RRM measurement result is greater than or equal to the first threshold, relaxing RRM measurement for the local cell; and in a case that the comparison result is that the RRM measurement result is greater than or equal to the second threshold and less than the first threshold, relaxing RRM measurement for the local cell and a neighboring cell.

Optionally, in a case that the first threshold is the S-measure threshold and the first delta threshold is less than 0, the processor 610 is further configured to perform at least one of the following operations:

in a case that the comparison result is that the RRM measurement result is greater than or equal to the first threshold, relaxing RRM measurement for the local cell; and in a case that the comparison result is that the RRM measurement result is greater than or equal to the sum of the first threshold and the first delta threshold and less than the first threshold, relaxing RRM measurement for the local cell and a neighboring cell.

Optionally, the at least one RRM measurement threshold includes: a third threshold.

The processor 610 is further configured to: in a case that the comparison result is that the RRM measurement result is less than the third threshold, enhance RRM measurement.

Optionally, the at least one RRM measurement threshold includes: a third threshold and a fourth threshold.

The processor 610 is further configured to:

in a case that the comparison result is that the RRM measurement result is less than a third target value, enhance RRM measurement.

The third target value is a minimum value of the third threshold and the fourth threshold.

Optionally, the at least one RRM measurement threshold includes: a third threshold and a second delta threshold.

The processor 610 is further configured to:

in a case that the comparison result is that the RRM measurement result is less than a fourth target value, enhance RRM measurement.

In a case that the second delta threshold is greater than or equal to 0, the fourth target value is the third threshold; or in a case that the second delta threshold is less than 0, the fourth target value is a sum of the third threshold and the second delta threshold.

Optionally, the third threshold is an S-measure threshold.

Optionally, in a case that the third threshold is the S-measure threshold and the third threshold is less than the fourth threshold, the processor 610 is further configured to perform at least one of the following operations:

in a case that the comparison result is that the RRM measurement result is less than the third threshold, enhancing RRM measurement for the local cell and a neighboring cell; and in a case that the comparison result is that the RRM measurement result is greater than or equal to the third threshold and less than the fourth threshold, enhancing RRM measurement for the local cell.

Optionally, in a case that the third threshold is the S-measure threshold and the second delta threshold is greater than 0, the processor 610 is further configured to perform at least one of the following operations:

in a case that the comparison result is that the RRM measurement result is less than the sum of the third threshold and the second delta threshold, enhancing RRM measurement for the local cell and a neighboring cell; and in a case that the comparison result is that the RRM measurement result is less than the sum of the third threshold and the second delta threshold and greater than or equal to the third threshold, enhancing RRM measurement for the local cell.

Optionally, the radio frequency unit 601 is configured to: receive configuration information sent by a network-side device, where the configuration information is used to configure at least one RRM measurement threshold.

Optionally, the at least one RRM measurement threshold has a correspondence relationship with at least one of the following objects: a terminal, a cell, a frequency, a carrier, a band, or a bandwidth part BWP.

It should be noted that the terminal 600 in this embodiment is capable of implementing the processes that can be implemented by the terminal in the method embodiment of the embodiments of this disclosure, with the same beneficial effects achieved. To avoid repetition, details are not described herein again.

It should be understood that, in this embodiment of this disclosure, the radio frequency unit 601 may be configured to: receive and transmit signals in an information receiving/transmitting process or a call process; and specifically, after receiving downlink data from a base station, transmit the downlink information to the processor 610 for processing, and in addition, transmit uplink data to the base station. Generally, the radio frequency unit 601 includes but is not limited to an antenna, at least one amplifier, a transceiver, a coupler, a low noise amplifier, a duplexer, and the like. In addition, the radio frequency unit 601 may also communicate with a network and other devices via a wireless communications system.

The terminal provides a user with wireless broadband internet access through the network module 602, for example, helping the user to transmit and receive e-mails, browse web pages, and access streaming media.

The audio output unit 603 may convert audio data received by the radio frequency unit 601 or the network module 602 or stored in the memory 609 into an audio signal and output the audio signal as a sound. Furthermore, the audio output unit 603 may also provide audio output (for example, a call signal received sound or a message received sound) related to a specific function performed by the terminal 600. The audio output unit 603 includes a speaker, a buzzer, a receiver, and the like.

The input unit 604 is configured to receive an audio or video signal. The input unit 604 may include a graphics processing unit (GPU) 6041 and a microphone 6042. The graphics processing unit 6041 processes image data of a still picture or a video obtained by an image capture apparatus (for example, a camera) in an image capture mode or a video capture mode. A processed image frame may be displayed on the display unit 606. The image frame processed by the graphics processing unit 6041 may be stored in the memory 609 (or another storage medium) or be transmitted by the radio frequency unit 601 or the network module 602. The microphone 6042 is capable of receiving sounds and processing such sounds into audio data. The processed audio data may be converted in a telephone call mode into a format that can be transmitted by the radio frequency unit 601 to a mobile communications base station, for outputting.

The terminal 600 may further include at least one sensor 605, for example, an optical sensor, a motion sensor, and another sensor. Specifically, the optical sensor may include an ambient light sensor and a proximity sensor. The ambient light sensor may adjust luminance of the display panel 6061 based on brightness of ambient light, and the proximity sensor may turn off the display panel 6061 and/or backlight when the terminal 600 moves close to an ear. As a type of motion sensor, an accelerometer sensor can detect magnitudes of accelerations in all directions (usually three axes), can detect a magnitude and a direction of gravity when the mobile phone is in a static state, and can be applied to posture recognition (such as screen switching between portrait and landscape, related games, and magnetometer posture calibration) of the terminal, functions related to vibration recognition (such as pedometer and tapping), and the like. The sensor 605 may also include a fingerprint sensor, a pressure sensor, an iris sensor, a molecular sensor, a gyroscope, a barometer, a hygrometer, a thermometer, an infrared sensor, and the like. Details are not described herein.

The display unit 606 is configured to display information input by the user or information provided to the user. The display unit 606 may include the display panel 6061. The display panel 6061 may be configured in a form of a liquid crystal display (LCD), an organic light-emitting diode (OLED), or the like.

The user input unit 607 may be configured to receive input digit or character information and generate key signal input related to user setting and function control of the mobile terminal. Specifically, the user input unit 607 may include a touch panel 6071 and other input devices 6072. The touch panel 6071 is also referred to as a touchscreen and can collect a touch operation (such as an operation performed by the user on the touch panel 6071 or near the touch panel 6071 with a finger or by using any proper object or accessory such as a stylus) of the user on or near the touch panel 6071. The touch panel 6071 may include two parts: a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touchpoint coordinates, and transmits the touchpoint coordinates to the processor 610, and can receive a command transmitted by the processor 610 and execute the command. In addition, the touch panel 6071 may be implemented in a plurality of forms, for example, as a resistive, capacitive, infrared, or surface acoustic wave touch panel. The user input unit 607 may further include the other input devices 6072 in addition to the touch panel 6071. Specifically, the other input devices 6072 may include but are not limited to a physical keyboard, a function key (such as a volume control key or an on/off key), a trackball, a mouse, and a joystick. Details are not described herein.

Further, the touch panel 6071 may cover the display panel 6061. When detecting a touch operation on or near the touch panel 6071, the touch panel 6071 transmits the touch operation to the processor 610 to determine a type of a touch event. Then, the processor 610 provides a corresponding visual output on the display panel 6061 based on the type of the touch event. Although in FIG. 6, the touch panel 6071 and the display panel 6061 act as two independent parts to implement input and output functions of the terminal, in some embodiments, the touch panel 6071 and the display panel 6061 may be integrated to implement the input and output functions of the terminal. This is not specifically limited herein.

The interface unit 608 is an interface between an external apparatus and the terminal 600. For example, the external apparatus may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 608 may be configured to: receive input (for example, data information and power) from the external apparatus, and transmit the received input to one or more elements in the terminal 600, or may be configured to transmit data between the terminal 600 and the external apparatus.

The memory 609 may be configured to store software programs and various data. The memory 609 may primarily include a program storage area and a data storage area. The program storage area may store an operating system, an application (such as an audio play function and an image play function) required by at least one function, and the like. The data storage area may store data (such as audio data and a phone book) created based on use of the mobile phone. In addition, the memory 609 may include a high-speed random access memory, and may further include a non-volatile memory such as at least one disk storage device, a flash memory device, or another volatile solid-state storage device.

The processor 610 is a control center of the terminal, and is connected to all components of the terminal by using various interfaces and lines. By running or executing a software program and/or module that is stored in the memory 609 and calling data stored in the memory 609, the processor 610 executes various functions of the terminal and processes data, so as to perform overall monitoring on the terminal. The processor 610 may include one or more processing units. Optionally, the processor 610 may integrate an application processor and a modem processor. The application processor mainly processes the operating system, a user interface, an application program, and the like. The modem processor mainly processes wireless communication. It can be understood that the modem processor may alternatively be not integrated in the processor 610.

The terminal 600 may further include the power supply 611 (such as a battery) supplying power to each component. Optionally, the power supply 611 may be logically connected to the processor 610 by using a power management system, so that functions such as charge and discharge management and power consumption management are implemented by using the power management system.

In addition, the terminal 600 includes some functional modules that are not shown. Details are not described herein.

Optionally, an embodiment of this disclosure further provides a terminal, including a processor 610, a memory 609, and a program stored in the memory 609 and capable of running on the processor 610. When the program is executed by the processor 610, processes of the foregoing measurement method embodiment can be implemented, with a same technical effect achieved. To avoid repetition, details are not described herein again.

Figure 7:
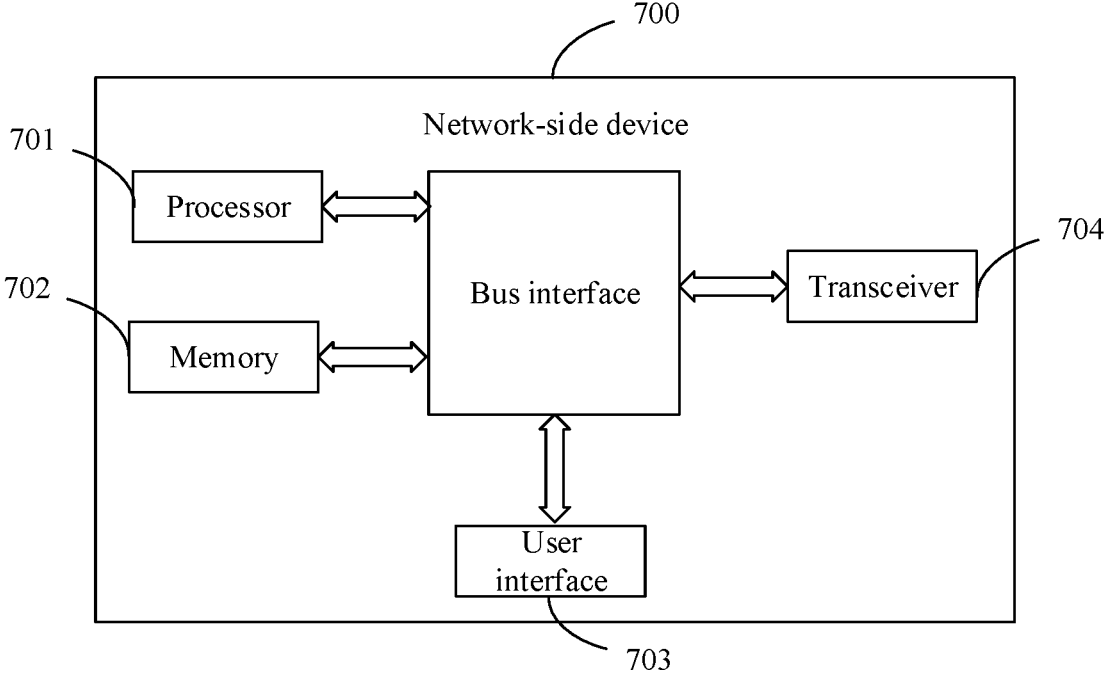
FIG. 7 is a second structural diagram of a network-side device according to an embodiment of this disclosure.

Referring to FIG. 7, FIG. 7 is a second structural diagram of a network-side device according to an embodiment of this disclosure. As shown in FIG. 7, the network-side device 700 includes a processor 701, a memory 702, a user interface 703, a transceiver 704, and a bus interface.

In this embodiment of this disclosure, the network-side device 700 further includes a computer program stored in the memory 702 and capable of running on the processor 701. When the computer program is executed by the processor 701, the following step is implemented:

sending configuration information, where the configuration information is used to configure at least one RRM measurement threshold, and the at least one RRM measurement threshold is used to adjust RRM measurement.

In FIG. 7, a bus architecture may include any quantity of interconnected buses and bridges, specifically for interconnecting various circuits of one or more processors represented by the processor 701 and a memory represented by the memory 702. The bus architecture may further interconnect various other circuits such as a peripheral device, a voltage regulator, and a power management circuit. These are all well known in the art, and therefore are not further described in this specification. The bus interface provides an interface. The transceiver 704 may be a plurality of components, that is, the transceiver 704 includes a transmitter and a receiver, and provides a unit for communicating with various other apparatuses on a transmission medium. For different user equipments, the user interface 703 may also be an interface for externally or internally connecting a required device, and the connected device includes but is not limited to a mini keyboard, a display, a speaker, a microphone, a joystick, or the like.

The processor 701 is responsible for management of the bus architecture and general processing, and the memory 702 is capable of storing data that is used by the processor 701 during operation.

The network-side device 700 is capable of implementing the processes implemented by the network-side device in the method embodiment. To avoid repetition, details are not described herein again.

An embodiment of this disclosure further provides a computer-readable storage medium, where the computer-readable storage medium stores a program. When the program is executed by a processor, the processes of the foregoing measurement method embodiment or the processes of the foregoing configuration method embodiment are implemented, with the same technical effects achieved. To avoid repetition, details are not described herein again. The computer-readable storage medium is, for example, a read-only memory (ROM), a random access memory (RAM), a magnetic disk, or an optical disc.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this disclosure essentially, or the part contributing to the related art, may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The foregoing describes the embodiments of this disclosure with reference to the accompanying drawings. However, this disclosure is not limited to the foregoing specific implementation manners. The foregoing specific implementation manners are merely illustrative rather than restrictive. As instructed by this disclosure, persons of ordinary skill in the art may develop many other manners without departing from principles of this disclosure and the protection scope of the claims, and all such manners fall within the protection scope of this disclosure.

What is claimed is:

1. A measurement method, applied to a terminal, wherein the method comprises:

obtaining at least one radio resource management (RRM) measurement threshold; and adjusting RRM measurement based on an RRM measurement result for a local cell of the terminal and the at least one RRM measurement threshold;

wherein the adjusting RRM measurement based on an RRM measurement result for a local cell of the terminal and the at least one RRM measurement threshold comprises: relaxing RRM measurement in a case that a comparison result satisfies a first condition; wherein the comparison result is a comparison result between the RRM measurement result and the at least one RRM measurement threshold; and wherein the at least one RRM measurement threshold comprises a first threshold and a second threshold, the first threshold is an S-measure threshold, and the second threshold is a measurement relaxation determining threshold; and the relaxing RRM measurement in a case that a comparison result satisfies a first condition comprises:

in a case that the comparison result is that the RRM measurement result is greater than or equal to a first target value, relaxing RRM measurement; wherein the first target value is a maximum value of the first threshold and the second threshold, wherein in a case that the first threshold is greater than or equal to the second threshold, the relaxing RRM measurement in a case that a comparison result satisfies a first condition comprises at least one of the following:

in a case that the comparison result is that the RRM measurement result is greater than or equal to the first threshold, relaxing RRM measurement for the local cell; and in a case that the comparison result is that the RRM measurement result is greater than or equal to the second threshold and less than the first threshold, relaxing RRM measurement for the local cell and a neighboring cell.

2. The method according to claim 1, wherein the relaxing RRM measurement in a case that a comparison result satisfies a first condition, comprises at least one of the following:

extending a period of RRM measurement;

reducing the number of samples for RRM measurement;

reducing the number of times of RRM measurement;

reducing the number of cells for RRM measurement;

reducing the number of beams for RRM measurement;

reducing the number of reference signals for RRM measurement;

reducing the number of frequencies for RRM measurement; and using an additional reference signal for RRM measurement.

3. The method according to claim 1, wherein the adjusting RRM measurement based on an RRM measurement result for a local cell of the terminal and the at least one RRM measurement threshold further comprises: enhancing RRM measurement in a case that the comparison result satisfies a second condition, the enhancing RRM measurement in a case that the comparison result satisfies a second condition, comprises at least one of the following:

shortening a period of RRM measurement;

increasing the number of samples for RRM measurement;

increasing the number of times of RRM measurement;

increasing the number of cells for RRM measurement;

increasing the number of beams for RRM measurement;

increasing the number of reference signals for RRM measurement;

increasing the number of frequencies for RRM measurement; and using an additional reference signal and a first reference signal for RRM measurement.

4. The method according to claim 1, wherein the adjusting RRM measurement further comprises:

adjusting RRM measurement for a first cell, wherein the first cell is at least one of the local cell and a neighboring cell.

5. The method according to claim 1, wherein the obtaining at least one RRM measurement threshold comprises:

receiving configuration information sent by a network-side device, wherein the configuration information is used to configure at least one RRM measurement threshold, or wherein the at least one RRM measurement threshold has a correspondence relationship with at least one of the following objects: a terminal, a cell, a frequency, a carrier, a band, or a bandwidth part BWP.

6. A terminal, comprising a processor, a memory, and a program stored in the memory and executed by the processor, wherein when the program is executed by the processor, the processor is configured to implement steps of the configuration method according to claim 1:

obtaining at least one radio resource management (RRM) measurement threshold; and adjusting RRM measurement based on an RRM measurement result for a local cell of the terminal and the at least one RRM measurement threshold;

wherein the adjusting RRM measurement based on an RRM measurement result for a local cell of the terminal and the at least one RRM measurement threshold comprises: relaxing RRM measurement in a case that a comparison result satisfies a first condition; wherein the comparison result is a comparison result between the RRM measurement result and the at least one RRM measurement threshold; and wherein the at least one RRM measurement threshold comprises a first threshold and a second threshold, the first threshold is an S-measure threshold, and the second threshold is a measurement relaxation determining threshold; and the relaxing RRM measurement in a case that a comparison result satisfies a first condition comprises:

in a case that the comparison result is that the RRM measurement result is greater than or equal to a first target value, relaxing RRM measurement; wherein the first target value is a maximum value of the first threshold and the second threshold, wherein in a case that the first threshold is greater than or equal to the second threshold, the relaxing RRM measurement in a case that a comparison result satisfies a first condition comprises at least one of the following:

in a case that the comparison result is that the RRM measurement result is greater than or equal to the first threshold, relaxing RRM measurement for the local cell; and in a case that the comparison result is that the RRM measurement result is greater than or equal to the second threshold and less than the first threshold, relaxing RRM measurement for the local cell and a neighboring cell.

7. A configuration method, applied to a network-side device, wherein the method comprises:

sending configuration information, wherein the configuration information is used to configure at least one RRM measurement threshold, and the at least one RRM measurement threshold is used to adjust RRM measurement;

wherein the adjusting RRM measurement comprises: relaxing RRM measurement in a case that a comparison result satisfies a first condition; wherein the comparison result is a comparison result between the RRM measurement result and the at least one RRM measurement threshold; and wherein the at least one RRM measurement threshold comprises a first threshold and a second threshold, the first threshold is an S-measure threshold, and the second threshold is a measurement relaxation determining threshold; and the relaxing RRM measurement in a case that a comparison result satisfies a first condition comprises:

in a case that the comparison result is that the RRM measurement result is greater than or equal to a first target value, relaxing RRM measurement; wherein the first target value is a maximum value of the first threshold and the second threshold;

wherein in a case that the first threshold is greater than or equal to the second threshold, the relaxing RRM measurement in a case that a comparison result satisfies a first condition comprises at least one of the following:

in a case that the comparison result is that the RRM measurement result is greater than or equal to the first threshold, relaxing RRM measurement for the local cell; and in a case that the comparison result is that the RRM measurement result is greater than or equal to the second threshold and less than the first threshold, relaxing RRM measurement for the local cell and a neighboring cell, or, wherein the at least one RRM measurement threshold comprises a first threshold and a first delta threshold; and the relaxing RRM measurement in a case that a comparison result satisfies a first condition comprises:

in a case that the comparison result is that the RRM measurement result is greater than or equal to a second target value, relaxing RRM measurement; wherein in a case that the first delta threshold is greater than or equal to 0, the second target value is a sum of the first threshold and the first delta threshold; and in a case that the first delta threshold is less than 0, the second target value is the first threshold, wherein in a case that the first delta threshold is less than 0, the relaxing RRM measurement in a case that a comparison result satisfies a first condition comprises at least one of the following:

in a case that the comparison result is that the RRM measurement result is greater than or equal to the first threshold, relaxing RRM measurement for the local cell; and in a case that the comparison result is that the RRM measurement result is greater than or equal to the sum of the first threshold and the first delta threshold and less than the first threshold, relaxing RRM measurement for the local cell and a neighboring cell.

8. A network-side device, comprising a processor, a memory, and a program stored in the memory and executed by the processor, wherein when the program is executed by the processor, the processor is configured to implement steps of the configuration method according to claim 7:

obtaining at least one radio resource management (RRM) measurement threshold; and adjusting RRM measurement based on an RRM measurement result for a local cell of the terminal and the at least one RRM measurement threshold;

wherein the adjusting RRM measurement based on an RRM measurement result for a local cell of the terminal and the at least one RRM measurement threshold comprises: relaxing RRM measurement in a case that a comparison result satisfies a first condition; wherein the comparison result is a comparison result between the RRM measurement result and the at least one RRM measurement threshold; and wherein the at least one RRM measurement threshold comprises a first threshold and a first delta threshold; and the relaxing RRM measurement in a case that a comparison result satisfies a first condition comprises:

in a case that the comparison result is that the RRM measurement result is greater than or equal to a second target value, relaxing RRM measurement; wherein in a case that the first delta threshold is greater than or equal to 0, the second target value is a sum of the first threshold and the first delta threshold; and in a case that the first delta threshold is less than 0, the second target value is the first threshold, wherein in a case that the first delta threshold is less than 0, the relaxing RRM measurement in a case that a comparison result satisfies a first condition comprises at least one of the following:

in a case that the comparison result is that the RRM measurement result is greater than or equal to the first threshold, relaxing RRM measurement for the local cell; and in a case that the comparison result is that the RRM measurement result is greater than or equal to the sum of the first threshold and the first delta threshold and less than the first threshold, relaxing RRM measurement for the local cell and a neighboring cell.

9. A measurement method, applied to a terminal, wherein the method comprises:

obtaining at least one radio resource management (RRM) measurement threshold; and adjusting RRM measurement based on an RRM measurement result for a local cell of the terminal and the at least one RRM measurement threshold;

wherein the adjusting RRM measurement based on an RRM measurement result for a local cell of the terminal and the at least one RRM measurement threshold comprises: relaxing RRM measurement in a case that a comparison result satisfies a first condition; wherein the comparison result is a comparison result between the RRM measurement result and the at least one RRM measurement threshold; and wherein the at least one RRM measurement threshold comprises a first threshold and a first delta threshold; and the relaxing RRM measurement in a case that a comparison result satisfies a first condition comprises:

in a case that the comparison result is that the RRM measurement result is greater than or equal to a second target value, relaxing RRM measurement; wherein in a case that the first delta threshold is greater than or equal to 0, the second target value is a sum of the first threshold and the first delta threshold; and in a case that the first delta threshold is less than 0, the second target value is the first threshold, wherein in a case that the first delta threshold is less than 0, the relaxing RRM measurement in a case that a comparison result satisfies a first condition comprises at least one of the following:

in a case that the comparison result is that the RRM measurement result is greater than or equal to the first threshold, relaxing RRM measurement for the local cell; and in a case that the comparison result is that the RRM measurement result is greater than or equal to the sum of the first threshold and the first delta threshold and less than the first threshold, relaxing RRM measurement for the local cell and a neighboring cell.

* * * * *